(12) United States Patent
Khattab (10) Patent No.: US 10,931,223 B2
(45) Date of Patent: Feb. 23, 2021

(54) CIRCUIT FOR DETECTING STATUS OF GROUND CONNECTION IN AN ELECTRIC MOTOR

(71) Applicant: Regal Beloit America, Inc., Beloit, WI (US)

(72) Inventor: Mazen Mohamad Khattab, Dayton, OH (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 16/406,984

(22) Filed: May 8, 2019

(65) Prior Publication Data
US 2020/0358388 A1    Nov. 12, 2020

(51) Int. Cl.
*G01R 31/02* (2006.01)
*H02P 29/024* (2016.01)
*H02H 7/08* (2006.01)

(52) U.S. Cl.
CPC ......... *H02P 29/026* (2013.01); *H02H 7/0833* (2013.01)

(58) Field of Classification Search
CPC ............................ H02P 29/026; H02H 7/0833
See application file for complete search history.

(56) References Cited

U.S. PATENT DOCUMENTS

| 3,746,979 A | 7/1973 | Kildishev et al. |
| 3,976,987 A | 8/1976 | Anger |
| 4,551,811 A | 11/1985 | Taniguti |
| 4,556,946 A | 12/1985 | Taniguti |
| 4,912,589 A | 3/1990 | Stolarczyk |
| 5,121,282 A | 6/1992 | White |
| 5,446,682 A | 8/1995 | Janke et al. |
| 5,448,491 A | 9/1995 | Janke et al. |
| 5,450,328 A | 9/1995 | Janke et al. |
| 6,560,079 B1 | 5/2003 | Hirsh et al. |
| 9,413,178 B2 | 8/2016 | Khattab et al. |
| 2004/0136125 A1 | 7/2004 | Nemir et al. |

(Continued)

FOREIGN PATENT DOCUMENTS

| CN | 1129495 A | 8/1996 |
| CN | 1477747 A | 2/2004 |

(Continued)

*Primary Examiner* — Muhammad S Islam
(74) *Attorney, Agent, or Firm* — Armstrong Teasdale LLP (57) ABSTRACT

A circuit for detecting a status of a ground connection in an electric motor includes a rectifier, a converter, a voltage conditioning circuit, a leakage circuit, and a comparator. The rectifier couples to an AC line within the motor and generates a first DC voltage. The converter steps-down the first DC voltage to a second DC voltage. The voltage conditioning circuit couples to the converter, leakage circuit, and comparator, and generates a reference DC voltage signal and a leakage voltage from the second DC voltage. The leakage circuit includes an impedance coupled to ground, and applies the leakage voltage to the impedance and generates a measurement signal representing a leakage current through the impedance to ground. The comparator couples to the leakage circuit and generates a logic signal, indicating a status of the ground connection, based on a voltage difference between the reference DC voltage signal and the measurement signal.

19 Claims, 4 Drawing Sheets

(56) References Cited

U.S. PATENT DOCUMENTS

| | | | |
|---|---|---|---|
| 2005/0024798 A1 | 2/2005 | Reynoso et al. | |
| 2012/0091960 A1* | 4/2012 | Khattab | H02J 7/0029 |
| | | | 320/109 |
| 2015/0355260 A1 | 12/2015 | Franchini et al. | |
| 2016/0056622 A1* | 2/2016 | Hamilton | H02H 7/0833 |
| | | | 318/472 |
| 2017/0302212 A1* | 10/2017 | Marcinkiewicz | F04B 13/00 |
| 2018/0203054 A1 | 7/2018 | Romero et al. | |

FOREIGN PATENT DOCUMENTS

| | | |
|---|---|---|
| CN | 102763445 A | 10/2012 |
| CN | 103683202 A | 3/2014 |
| CN | 102012471 B | 10/2014 |
| CN | 107367637 A | 11/2017 |
| EP | 3149497 A1 | 4/2017 |
| WO | 2012164332 A1 | 12/2012 |
| WO | 2014027512 A1 | 2/2014 |
| WO | 2015184120 A1 | 12/2015 |

* cited by examiner

CIRCUIT FOR DETECTING STATUS OF GROUND CONNECTION IN AN ELECTRIC MOTOR

BACKGROUND

The field of the disclosure relates generally to electric motors and, more specifically, a circuit for detecting a status of a ground connection in an electric motor.

Most electric motors include one or more connections to Earth ground, or simply "ground." Connection to ground is generally necessary for proper operation and, in many installations, is required for electrical safety. For example, a proper ground connection is generally necessary to meet performance demands for electromagnetic compatibility (EMC). For another example, at least some regulatory jurisdictions require pool and spa pumps to include a least two connections to ground. Connections to ground are typically made by either a dedicated ground conductor coupled to a ground terminal on the electric motor or a metal casing of the electric motor, or by a ground conductor incorporated with the power conductors that supply the electric motor. Generally, the electrical components and metal housings are all coupled, or bonded, to the ground connection. Connections among the various components and ground should have very low impedance. If a proper ground connection is omitted, improperly wired, or severed, the electric motor itself may malfunction, or the equipment or appliance in which the electric motor is installed may malfunction. For example, when a ground connection is lost, electromagnetic interference (EMI) filtering may be degraded and result in increased electrical "noise" in and around the electric motor. Ground connections are typically manually inspected, however it is desirable that an electric motor be able to automatically detect a status of the ground connection and, more specifically, detect a loss of ground connection when it occurs.

BRIEF DESCRIPTION

In one aspect, a circuit for detecting a status of a connection to ground in an electric motor is provided. The circuit includes a rectifier, a converter, a voltage conditioning circuit, a leakage circuit, and a comparator. The rectifier is configured to be coupled to an alternating current (AC) line within the electric motor and is configured to generate a first direct current (DC) voltage. The converter is coupled to the rectifier and is configured to step-down the first DC voltage to a second DC voltage. The voltage conditioning circuit is coupled to the converter and is configured to generate a reference DC voltage signal and a leakage voltage from the second DC voltage. The leakage circuit is coupled to the voltage conditioning circuit and includes an impedance coupled to ground. The leakage circuit is configured to apply the leakage voltage to the impedance and generate a measurement signal representing a leakage current conducted through the impedance to ground. The comparator is coupled to the voltage conditioning circuit and the leakage circuit. The comparator is configured to generate a logic signal based on a voltage difference between the reference DC voltage signal and the measurement signal. The logic signal is indicative of the status of the connection to ground.

In another aspect, a method of detecting a status of a connection to ground in an electric motor is provided. The method includes coupling a rectifier to an alternating current (AC) line within the electric motor and rectifying an AC voltage to a first direct current (DC) voltage. The method also includes converting the first DC voltage to a second DC voltage and generating a reference DC voltage signal and the leakage voltage from the second DC voltage. The method further includes applying the leakage voltage to an impedance and generating a measurement signal representing a leakage current conducted through the impedance to ground. Additionally, the method includes comparing the measurement signal and the reference DC voltage signal to generate a logic signal indicative of the status of the connection to ground.

In yet another aspect, an electric motor is provided. The electric motor includes a stator, a rotor, a drive unit, and a ground detection circuit. The rotor is configured to turn with respect to the stator upon energization of the stator. The stator and rotor are disposed within a housing. The drive unit is disposed within the housing and is configured to receive a mains power at a mains terminal and regulate a stator current supplied to the stator. The ground detection circuit is coupled between the mains terminal and a ground connection. The ground detection circuit is configured to enable a leakage current and measure the leakage current to determine a status of the ground connection. The ground detection circuit is configured to transmit a logic signal indicative of the status of the ground connection to the drive unit.

DETAILED DESCRIPTION

Embodiments of the detection circuit described herein provide a circuit that enables a small leakage current to ground and measures the leakage current to determine a status of the connection to ground, or "ground connection." If the leakage current conducts, the ground connection is good. When the electric motor is powered, if the leakage current does not conduct, the ground connection is lost. The detection circuit is coupled between an alternating current (AC) line and ground, and is configured to generate a regulated direct current (DC) voltage suitable for generating the small leakage current and for a reference voltage against which a measurement signal can be compared for the purpose of detecting the status of the ground connection. In certain embodiments, the measurement signal is a measurement of the leakage current itself. In certain other embodiments, the measurement signal is a measurement of a voltage representative of the leakage current. Embodiments of the detection circuit described herein may further include one or more filter circuits, voltage regulation circuits, and logic circuits. For example, certain embodiments of the detection circuit further include a logic circuit or processor for generating a warning or other alert to a user, or for generating a status signal that is transmitted to another computing system that generates the warning or alert itself. In certain embodiments, the logic circuit or processor, or the computing system that receives the status signal, disables the electric motor or at least a portion of the equipment or appliance in which the electric motor is installed. The detection circuit described herein may, in certain embodiments, detect the status of the ground connection periodically, e.g., daily. In other embodiments, the status of the ground connection may be detected only upon start up, i.e., when power is applied to the electric motor. In certain embodiments, the status of the ground connection may be continuously monitored.

Certain embodiments of the detection circuit described herein include multiple, or redundant, legs that each independently detect the status of the ground connection. In such embodiments, the detection circuit may further include a logic circuit or processor for processing and making a status decision when the legs of the detection circuit agree or disagree. For example, in certain embodiments, a logic circuit may determine the ground connection is lost when one or more legs indicates the ground connection is lost. Conversely, in other embodiments, a logic circuit may determine the ground connection is lost when both, or all, legs of the detection circuit agree the ground connection is lost.

Certain embodiments may also include circuits for checking ground impedance or for identifying ground loops, both of which are independent safety verifications for electric motors, distinct from the status of the ground connection detected using the embodiments described herein. For example, ground impedance is preferably low and may be evaluated by comparing an actual current amplitude (amperes) to an expected current amplitude. Likewise, ground loops are identified by evaluating potential between multiple points on the ground bus. A voltage differential between two points on the ground bus may indicate a charging of the ground bus, or a circulating ground current. Both high ground impedance and ground loops are problems that may occur independent of a missing, severed, or otherwise lost ground connection in the electric motor. Notably, identifying a high ground impedance or a ground loop may not detect a lost ground connection in all circumstances.

Figure 1:
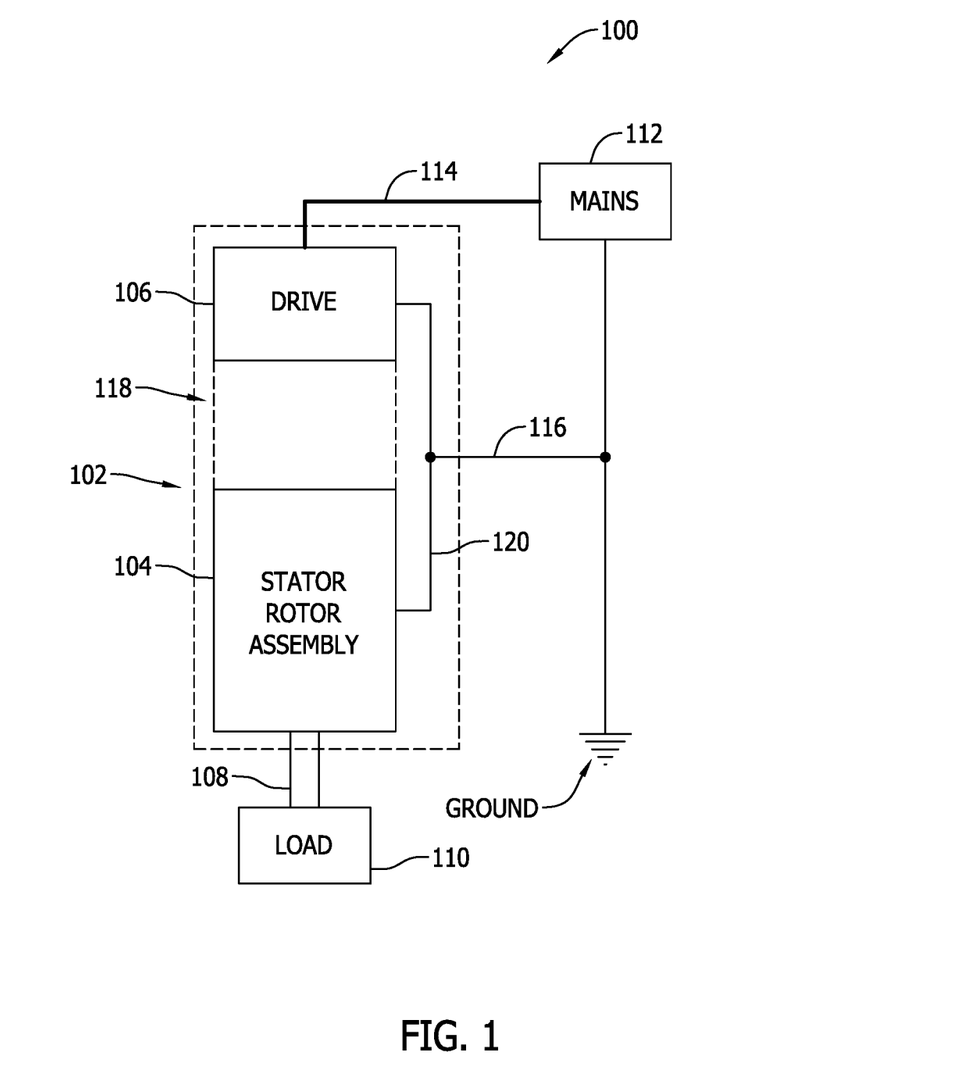
FIG. 1 is a block diagram of an exemplary system including an electric motor.

FIG. 1 is a schematic block diagram of a system 100 illustrating ground connections for an exemplary electric motor 102. Electric motor 102 includes a stator/rotor assembly 104 and a drive unit 106. Electric motor 102 includes a drive shaft 108 coupled to stator/rotor assembly 104 and, more specifically, the rotor (not shown). When the rotor turns, electric motor 102 drives a load 110. Electric motor 102 is supplied power from a mains power supply 112 over a mains power line 114, or harness or cable. Mains power supply 112 is any suitable power source capable of driving electric motor 102 such as, for example, an electric grid, generator, energy storage device, or renewable energy source. In at least some embodiments, mains power supply 112 includes an alternating current (AC) electric grid. Mains power supply 112 is electrically coupled to Earth ground, or simply "ground." Ground may be provided to system 100 through, for example, mains power supply 112 or by a local Earth ground bonding, e.g., a grounding rod. Electric motor 102 is grounded by at least one ground connection provided through mains power line 114 or by a dedicated ground conductor 116, or by both. Mains power line 114 may include, for example, a ground conductor along with line conductors, e.g., line and neutral, or line one and line two. In alternative embodiments, electric motor 102 may include one or more physical, or mechanical, ground contacts, e.g., mechanical bonding between a metal casing of electric motor 102 and a metal mount within an appliance or unit of equipment.

Grounds within stator/rotor assembly 104 and drive unit 106 are electrically coupled by either a mechanical bonding 118 or by a wired bonding 120. For example, a metal casing for stator/rotor assembly 104 may be mechanically bonded to a metal casing or ground contact for drive unit 106. Likewise, respective ground terminals for stator/rotor assembly 104 and drive unit 106 may be bonded by a ground conductor, or wired bonding 120.

Figure 2:
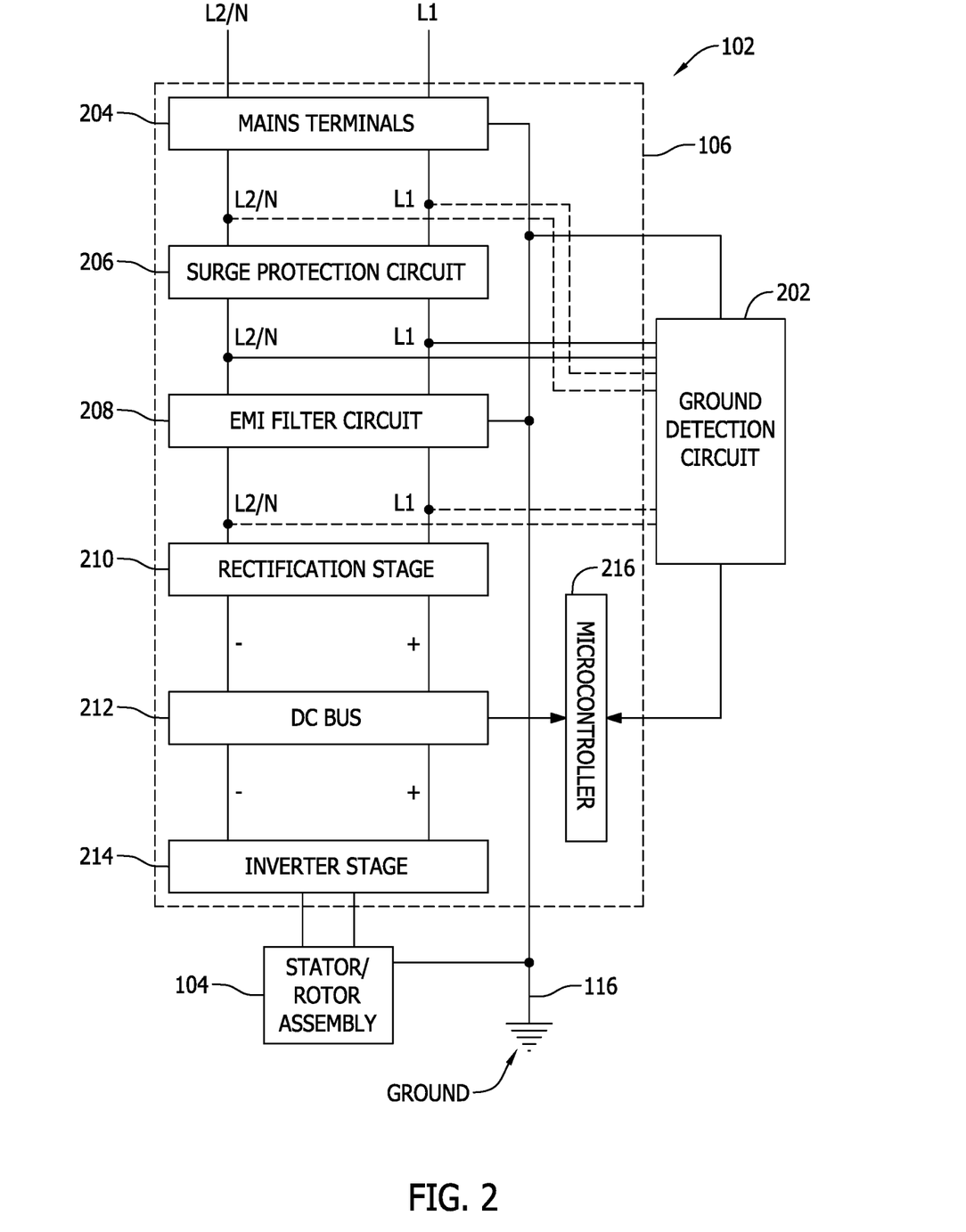
FIG. 2 is a schematic block diagram of the electric motor shown in FIG. 1.

FIG. 2 is a schematic block diagram of electric motor 102 (shown in FIG. 1). Electric motor 102 includes a ground detection circuit 202, stator/rotor assembly 104, and drive unit 106 (both shown in FIG. 1). Stator/rotor assembly 104 includes a stator and a rotor configured to turn with respect to the stator upon energization of the stator. Electric motor 102 also includes a housing (not shown) within which stator/rotor assembly 104 and drive unit 106 are disposed. Stator/rotor assembly 104 and drive unit 106 are electrically coupled to ground by a ground connection including, for example, ground conductor 116. In alternative embodiments, the ground connection may include a ground conductor included in mains power line 114, or both ground conductor 116 and mains power line 114. Ground detection circuit 202 is illustrated external to drive unit 106. However, in alternative embodiments, ground detection circuit 202 may be incorporated within drive unit 106 on a dedicated substrate or integrated onto at least one of the substrates on which drive unit 106 is implemented. In certain embodiments, ground detection circuit is disposed external to the housing of electric motor 102.

Drive unit 106 is configured to receive mains power at mains terminals 204 and regulates a stator current supplied to stator/rotor assembly 104 and, more specifically, the stator. Mains terminals 204 include a plurality of connection nodes to which mains power line 114 (shown in FIG. 1) may be electrically coupled. Mains terminals 204 may include, for example, one or more connectors configured to engage one or more connectors of mains power line 114. In alternative embodiments, mains terminals 204 may include, for example, respective lugs, contacts, or other connection points to which the conductors of mains power line 114 may be coupled. In certain embodiments, mains terminals 204 include a ground lug to which a ground conductor within mains power line 114 is coupled, thereby electrically coupling electric motor 102 to ground. Mains terminals 204 also includes, for example, a first alternating current (AC) line connection L1 and a second AC line connection L2. In certain embodiments, second AC line connection L2 is configured to conduct a second AC line current, or a second phase, e.g., for 240 Volt AC (VAC) embodiments, or to conduct neutral current, e.g., for single phase 120 VAC embodiments. In such embodiments, second AC line connection L2 is referred to as L2/N.

Drive unit 106 includes a surge protection circuit 206, an electromagnetic interference (EMI) filter circuit 208, a rectification stage 210, a direct current (DC) bus 212, and an inverter stage 214. Surge protection circuit 206 is coupled to first and second AC lines L1 and L2/N to suppress surge currents originating on the AC lines or at mains power supply 112. EMI filter circuit 208 is typically coupled to first and second AC line connections L1 and L2/N after surge protection circuit 206. EMI filter circuit 208 suppresses noise on first and second AC lines L1 and L2/N as a result of, for example, high frequency switching components in drive unit 106. In certain embodiments, one or both of surge protection circuit 206 and EMI filter circuit 208 may be omitted, for example, in implementations where electric motor 102 is otherwise protected from surge currents and EMI.

Rectification stage 210 is coupled to first and second AC lines L1 and L2/N after surge protection circuit 206 and EMI filter circuit 208. Rectification stage 210 converts AC power to DC power that energizes DC bus 212. DC bus 212 generally includes bus conductors and, in certain embodiments, one or more capacitors to mitigate voltage swings on the bus conductors due to supply changes or load changes. DC bus 212 supplies DC power to inverter stage 214. Inverter stage 214 includes a plurality of switching devices, such as insulated gate bipolar transistors (IGBTs), power metal-oxide semiconductor field effect transistors (MOSFETs), or other power semiconductors, for converting the DC power to a variable frequency, variable voltage signal for energizing the stator of stator/rotor assembly 104.

Electric motor 102 includes a microcontroller 216 for controlling, for example, the switching devices in inverter stage 214. Microcontroller 216 may be powered, for example, by DC bus 212 or by an additional DC-DC converter or DC power supply. Microcontroller 216 is also coupled to ground detection circuit 202 and is configured to receive a logic signal from ground detection circuit 202 indicating a status of the ground connection. In alternative embodiments, microcontroller 216 may be implemented external to drive unit 106. In further alternative embodiments, electric motor 102 may include an additional microcontroller coupled to ground detection circuit 202 and independent of microcontroller 216 that controls, for example, inverter stage 214.

Ground detection circuit 202 is coupled between mains terminals 204 and the ground connection, e.g., ground conductor 116. Ground detection circuit 202 is illustrated in FIG. 2 as coupled to first and second AC lines L1 and L2/N after surge protection circuit 206 and before EMI filter circuit 208. In alternative embodiments, ground detection circuit 202 is coupled to first and second AC lines L1 and L2/N after EMI filter circuit 208 and before rectification stage 210, and in other embodiments, after mains terminals 204 and before surge protection circuit 206 and EMI filter circuit 208 (when not omitted). In certain embodiments, ground detection circuit 202 may be coupled to only one of first and second AC lines L1 and L2/N. Generally, ground detection circuit 202 is configured to enable a leakage current that conducts to ground such that it can be measured to determine the status of the ground connection.

Ground detection circuit 202 transmits a logic signal indicative of the status of the ground connection to microcontroller 216. For example, the logic signal may indicate the ground connection is good, or that the ground connection is broken, severed, or otherwise lost. Microcontroller 216, in certain embodiments, may use the logic signal to enable or disable electric motor 102. For example, when the logic signal indicates the ground connection is lost, microcontroller 216 may disable electric motor 102. In alternative embodiments, microcontroller 216 may generate a warning signal or other message to a user interface or a remote system or controller.

Figure 3:
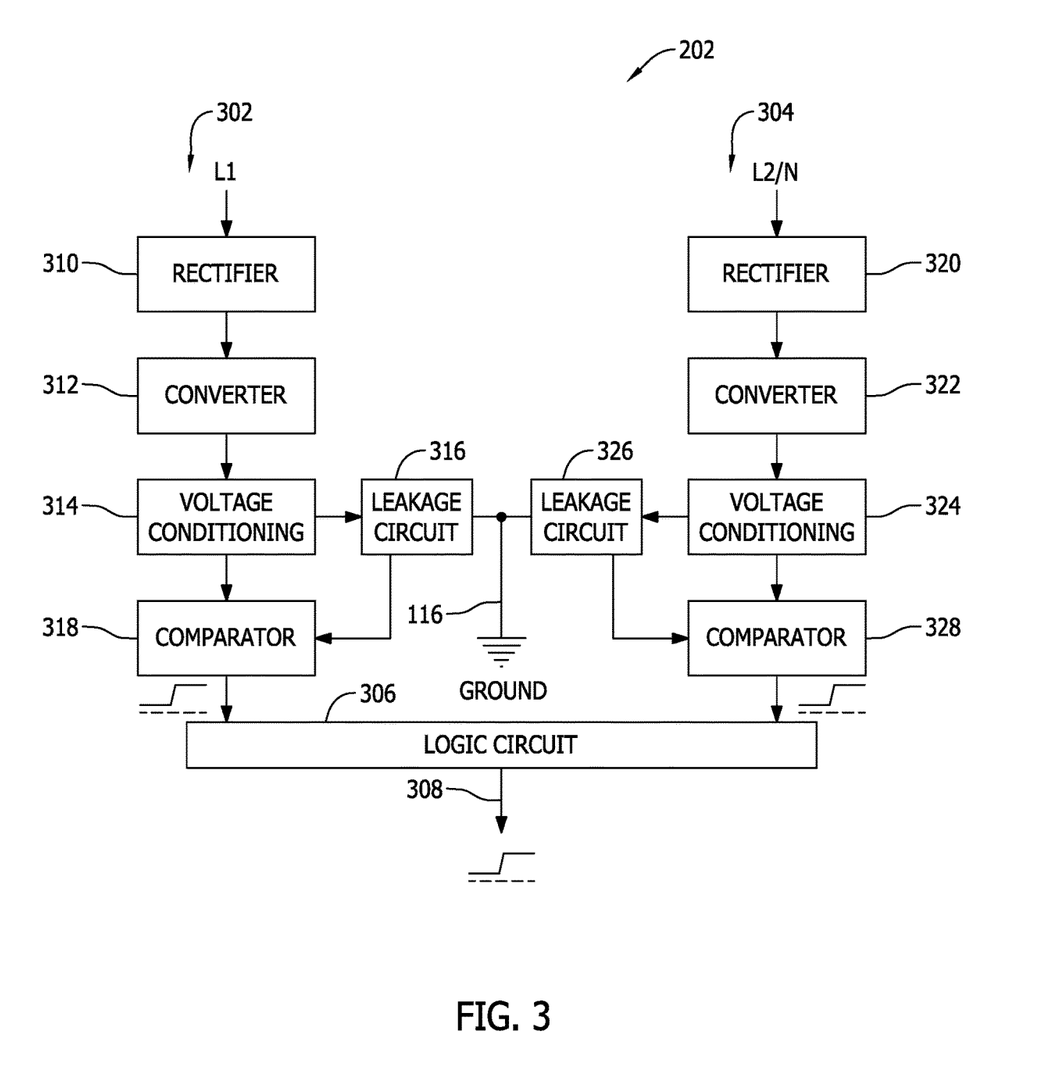
FIG. 3 is a schematic block diagram of an exemplary ground detection circuit for use in the electric motor shown in FIG. 2.

FIG. 3 is a schematic block diagram of the ground detection circuit 202 (shown in FIG. 2). Ground detection circuit 202 includes a first leg 302 and a second leg 304. First leg 302 operates using power supplied by first AC line L1 and second leg 304 operates using power supplied by second AC line L2/N. The redundancy of first leg 302 and second leg 304 enables ground detection circuit 202 to determine the status of the ground connection, for example, when one leg fails or a phase of power from mains power supply 112 is lost. Ground detection circuit 202 includes a logic circuit 306 that combines, or compares, logical outputs from first leg 302 and second leg 304 into a single logic signal, or status signal 308, indicating the status of the ground connection. Logic circuit 306 may be implemented using discrete logic components, a field programmable gate array (FPGA), or any other suitable processing device. Logic circuit 306, in certain embodiments, may be configured to determine the ground connection is lost only when both first leg 302 and second leg 304 agree. In other embodiments, logic circuit 306 may determine the ground connection is lost when either or both of first leg 302 and second leg 304 indicate the ground connection is lost. In certain embodiments, ground detection circuit 202 may include only a single leg, e.g., first leg 302, to monitor the ground connection using a single phase of the AC power or a neutral line, e.g., L1 or L2/N.

First leg 302 and second leg 304 may, in certain embodiments, be implemented using discrete or analog components. In alternative embodiments, first leg 302 and second leg 304 may be implemented in one or more integrated circuits.

First leg 302 includes a rectifier 310, a converter 312, a voltage conditioning circuit 314, a leakage circuit 316, and a comparator 318. Rectifier 310 is configured to receive an AC signal from first AC line L1 and convert the AC signal to a first DC signal having a first DC voltage. Converter 312 steps-down the rectified voltage of the first DC signal to a second DC voltage for powering various components within first leg 302. Converter 312 may include, for example, a voltage divider circuit configured to step down the DC voltage to 3.3 VDC.

Voltage conditioning circuit 314 is coupled to converter 312 and is configured to generate a reference DC voltage signal and a leakage voltage from the second DC voltage. Voltage conditioning circuit may include one or more smoothing filter configured to reduce ripple in the reference DC voltage signal and leakage voltage. Voltage conditioning circuit 314 may include, for example, one or more low-pass filter configured to reduce noise in the reference DC voltage signal and leakage voltage. Generally, the cutoff frequency should be low to suppress noise in the DC signals. Voltage conditioning circuit 314 may also include a precision voltage supply circuit configured to produce a substantially constant DC voltage for the reference DC voltage signal and leakage voltage. A substantially constant DC voltage, in certain embodiments, is one that varies no more than plus-or-minus 5% in amplitude. In other embodiments, comparator 318 and leakage circuit 316 may be more or less tolerant of variations in the reference DC voltage signal and leakage voltage, respectively.

The reference DC voltage signal is supplied to comparator 318, and the leakage voltage is supplied to leakage circuit 316. Leakage circuit 316 is coupled to voltage conditioning circuit 314 and includes an impedance coupled to ground through, for example, ground conductor 116. The impedance may include, for example, a current sense resistor. Leakage circuit 316 is configured to apply the leakage voltage to the impedance to generate a leakage current conducted through the impedance to ground. Leakage circuit 316 generates a measurement signal that represents the leakage current. In certain embodiments, the measurement signal is a voltage measured across, or a voltage drop across, the impedance, and the measured voltage represents an amplitude of the leakage current. In alternative embodiments, the measurement signal may directly represent the amplitude of the leakage current. The measurement signal may be generated, for example, by a current transformer. Leakage circuit 316 transmits the measurement signal to comparator 318.

Comparator 318 is coupled to voltage conditioning circuit 314 and leakage circuit 316. Comparator 318 is configured to generate a logic signal based on a voltage difference between the reference DC voltage signal from voltage conditioning circuit 314 and the measurement signal from leakage circuit 316. The logic signal indicates the status of the ground connection. For example, if the comparison indicates the leakage current to ground is at or near zero, then the logic signal indicates the ground connection is lost. Conversely, if the leakage current to ground is non-zero, then the connection to ground is good. The amplitude of the leakage current should be large enough to properly detect, but small enough that it does not, for example, trip a ground-fault interrupter device or otherwise trigger a ground fault.

Second leg 304 includes a rectifier 320, a converter 322, a voltage conditioning circuit 324, a leakage circuit 326, and a comparator 328, all which operate as described above with respect to rectifier 310, converter 312, voltage conditioning circuit 314, leakage circuit 316, and comparator 318, respectively. Second leg 304, however, is coupled between second AC line L2/N and ground and therefore operates using power from a second phase or from a neutral line.

Logic circuit 306 is coupled to comparator 318 and comparator 328, and is configured to generate status signal 308 based on a combining, or comparison, of the respective logic signals generated by comparator 318 and comparator 328.

Figure 4:
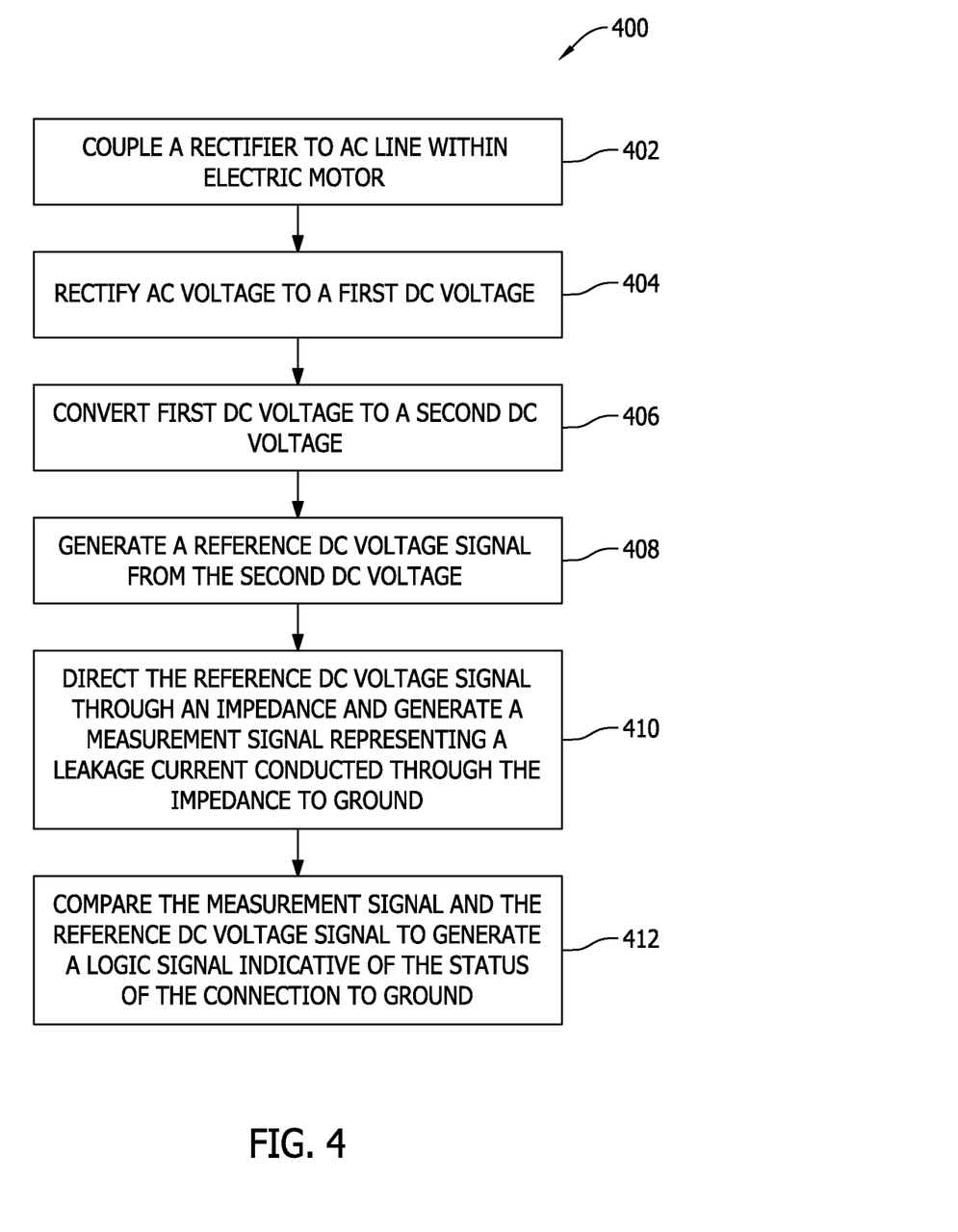
FIG. 4 is a flow diagram of an exemplary method of detecting a status of a connection to ground for use in the electric motor shown in FIG. 2.

FIG. 4 is a flow diagram of an exemplary method 400 of detecting a status of a connection to ground for use in electric motor 102 (shown in FIG. 2). Method 400 may be embodied, for example, in ground detection circuit 202 (shown in FIGS. 2 and 3). Method 400 includes coupling 402 rectifier 310 to an AC line, such as first AC line L1. An AC voltage supplied on first AC line L1 is rectified 404 to a first DC voltage, which is then supplied to converter 312 for conversion 406 to a second DC voltage. The second DC voltage is supplied to voltage conditioning circuit 314, which generates 408 a reference DC voltage signal and a leakage voltage from the second DC voltage, and supplies the reference DC voltage signal comparator 318 and the leakage voltage to leakage circuit 316. In certain embodiments, method 400 includes low-pass filtering the second DC voltage signal to reduce noise, for example, in the reference DC voltage signal and leakage voltage.

Leakage circuit 316 applies 410 the leakage voltage to an impedance and generates a measurement signal representing a leakage current conducted through the impedance to ground. Leakage circuit 316 may be controlled, for example, by microcontroller 216 (shown in FIG. 2) to periodically close leakage circuit 316 to generate the leakage current, thereby enabling ground detection circuit 202 to periodically determine the status of the ground connection.

Comparator 318 compares 412 the measurement signal from leakage circuit 316 and the reference DC voltage signal from voltage conditioning circuit 314 to generate a logic signal indicative of the status of the connection to ground. Comparator 318 may transmit the logic signal to a processor, such as microcontroller 216. Alternatively, comparator 318 may transmit the logic signal to logic circuit 306 (shown in FIG. 3) for comparison to a second logic signal generated based on a second leakage current sourced from another AC line, such as second AC line L2/N within electric motor 102.

The methods and systems described herein may be implemented using computer programming or engineering techniques including computer software, firmware, hardware or any combination or subset thereof, wherein the technical effect may include at least one of: (a) enabling an electric motor to automatically determine a status of a ground connection; (b) generating small leakage current to ground to enable detection of the leakage current without generating or otherwise triggering a ground fault; (c) enabling ground detection on one or more phases or neutral lines of an AC power supply within an electric motor; (d) generating signals, messages, warnings, or alerts to remote systems, user interfaces, or users indicating the status of the ground connection; and (e) disabling an electric motor when a missing, broken, severed, or otherwise lost ground connection is detected.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "microcontroller," "processor," and "computer," and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit for detecting a status of a connection to ground in an electric motor, said circuit comprising:
   a rectifier configured to be coupled to an alternating current (AC) line within the electric motor and configured to generate a first direct current (DC) voltage;
   a converter coupled to said rectifier and configured to step-down the first DC voltage to a second DC voltage;
   a voltage conditioning circuit coupled to said converter and configured to generate a reference DC voltage signal and a leakage voltage from the second DC voltage;
   a leakage circuit coupled to said voltage conditioning circuit and comprising an impedance coupled to ground, said leakage circuit configured to apply the leakage voltage to said impedance and generate a measurement signal representing a leakage current conducted through said impedance to ground; and
   a comparator coupled to said voltage conditioning circuit, said leakage circuit and a drive unit of the electric motor, the drive unit configured to receive a mains power at a mains terminal and regulate a stator current supplied to a stator of the electric motor, said comparator configured to generate a first logic signal based on a voltage difference between the reference DC voltage signal and the measurement signal, the first logic signal indicative of the status of the connection to ground, wherein the drive unit is further configured to disable a supply of current to said stator in response to the first logic signal.

2. The circuit of claim 1, wherein the rectifier is further configured to be coupled to the AC line between a surge protection circuit and an electromagnetic interference (EMI) filter circuit of the electric motor.

3. The circuit of claim 1, wherein said voltage conditioning circuit comprises a smoothing filter configured to reduce ripple in the reference DC voltage signal.

4. The circuit of claim 1, wherein said voltage conditioning circuit comprises a low-pass filter configured to reduce noise in the reference DC voltage signal.

5. The circuit of claim 1, wherein said voltage conditioning circuit comprises a precision voltage supply circuit configured to produce a substantially constant DC voltage for the reference DC voltage signal and the leakage voltage.

6. The circuit of claim 1, wherein said leakage circuit comprises a current-sense resistor coupled to ground and the measurement signal is indicative of a voltage drop across said current-sense resistor.

7. The circuit of claim 1, wherein said leakage circuit comprises a logic circuit configured to compare the first logic signal to a second logic signal indicative of the status of the connection to ground and based on a second leakage current sourced from a second AC line within the electric motor.

8. The circuit of claim 1, wherein said converter comprises a voltage divider circuit.

9. A method of detecting a status of a connection to ground in an electric motor, said method comprising:
   coupling a rectifier to an alternating current (AC) line within the electric motor;
   rectifying an AC voltage to a first direct current (DC) voltage;
   converting the first DC voltage to a second DC voltage;
   generating a reference DC voltage signal and a leakage voltage from the second DC voltage;
   applying the leakage voltage to an impedance and generating a measurement signal representing a leakage current conducted through the impedance to ground;
   comparing the measurement signal and the reference DC voltage signal to generate a first logic signal indicative of the status of the connection to ground; and
   disabling a supply of current a stator of the electric motor in response to the first logic signal.

10. The method of claim 9 further comprising transmitting the logic signal to a processor of the electric motor.

11. The method of claim 9 further comprising low-pass filtering the reference DC voltage signal.

12. The method of claim 9, wherein applying the leakage voltage comprises periodically closing a leakage circuit coupling the impedance to ground.

13. The method of claim 9 further comprising comparing the first logic signal to a second logic signal indicative of the status of the connection to ground and based on a second leakage current sourced from a second AC line within the electric motor.

14. The method of claim 10 further comprising disabling, by the processor, the electric motor.

15. An electric motor, comprising:
a stator and a rotor configured to turn with respect to said stator upon energization thereof, said stator and said rotor disposed within a housing;
a drive unit disposed within the housing and configured to receive a mains power at a mains terminal and regulate a stator current supplied to said stator; and
a ground detection circuit coupled between said mains terminal and a ground connection, said ground detection circuit configured to:
enable a leakage current;
measure the leakage current to determine a status of the ground connection; and
transmit a logic signal indicative of the status of the ground connection to said drive unit, wherein said drive unit is further configured to disable a supply of current to said stator in response to the logic signal.

16. The electric motor of claim 15, wherein said drive unit further comprises a surge protection circuit coupled between the mains terminal and said ground detection circuit.

17. The electric motor of claim 15, wherein said drive unit is further configured to receive at least two phases of AC power at the mains terminal, and wherein said ground detection circuit comprises respective legs for each of the at least two phases.

18. The electric motor of claim 15, wherein said drive unit is further configured, when the logic signal indicates the ground connection is lost, to transmit a warning message to a remote system.

19. The electric motor of claim 15, wherein said drive unit is further configured, when the logic signal indicates the ground connection is lost, to transmit a warning message to a user interface on the electric motor.

* * * * *